United States Patent
Liang et al.

(10) Patent No.: US 7,675,995 B2
(45) Date of Patent: Mar. 9, 2010

(54) APPARATUS AND METHOD FOR CONDITIONING A MODULATED SIGNAL IN A COMMUNICATIONS DEVICE

(75) Inventors: Paul Cheng-Po Liang, Santa Clara, CA (US); Richard H. Strandberg, Davis, CA (US)

(73) Assignee: Panasonic Corporation, Osaka (JP)

( * ) Notice: Subject to any disclaimer, the term of this patent is extended or adjusted under 35 U.S.C. 154(b) by 981 days.

(21) Appl. No.: 11/274,068

(22) Filed: Nov. 14, 2005

(65) Prior Publication Data

US 2007/0110184 A1   May 17, 2007

(51) Int. Cl.
- H03C 3/00 (2006.01)
- H03K 7/06 (2006.01)
- H04L 27/12 (2006.01)

(52) U.S. Cl. .................... 375/302; 375/295
(58) Field of Classification Search ............. 375/302, 375/295

See application file for complete search history.

(56) References Cited

U.S. PATENT DOCUMENTS

| | | | |
|---|---|---|---|
| 4,550,601 A * | 11/1985 | Evans | 73/382 R |
| 6,760,348 B1 * | 7/2004 | Hendrichs et al. | 370/522 |
| 2004/0047430 A1 * | 3/2004 | McCarty, Jr. | 375/295 |
| 2004/0183817 A1 * | 9/2004 | Kaasila | 345/660 |
| 2008/0170640 A1 * | 7/2008 | Gao et al. | 375/302 |

FOREIGN PATENT DOCUMENTS

WO   WO 2005020530 A1 *   3/2005

* cited by examiner

*Primary Examiner*—David C Payne
*Assistant Examiner*—Brian J Stevens
(74) *Attorney, Agent, or Firm*—McDermott Will & Emery LLP (57) ABSTRACT

A device for transmitting information in a communications signal is envisioned. The information is modulated, at least in part, with a first angle-related characteristic. The device has a digital conversion circuit operable to convert information to be broadcast into a digital form. A constellation mapper is coupled to the digital conversion circuit, and is operable to convert the digital information into information associated with a constellation. A trajectory generation circuit generates samples denoting a trajectory within the constellation for the information. A transition analysis circuit determines a change in value of an angle-related characteristic in a transition between two samples, and a threshold detection circuit detects whether the change in value fails to meet a particular threshold. An angle-related characteristic distribution circuit can then distribute a portion of the change in value associated with the transition to at least one other transition.

16 Claims, 9 Drawing Sheets

APPARATUS AND METHOD FOR CONDITIONING A MODULATED SIGNAL IN A COMMUNICATIONS DEVICE

FIELD

The current application is directed to communications. In particular, this application is directed to conditioning modulated signals.

BACKGROUND

Contemporary communication systems often employ digital signals to effect communications. In a typical digital communication device, the transmitted source information is represented by a digital information stream. This digital information stream is modulated and amplified for transmission over a communication channel. Many complex digital modulation schemes have been developed to efficiently convey information across a communication channel. For digital modulation, a digital information stream is mapped onto a symbol constellation to generate a sequence of channel symbols.

As is common in with conventional solutions, a symbol constellation for a modulation scheme can be represented graphically as a set of symbols in a two-dimensional structure representing phase and amplitude. The transitions between the successive constellation points denote an exchange of information. In practical use, the transitions between the points are not necessarily in a straight line, but are modified through a trajectory determination circuit. One such trajectory determination apparatus would be a pulse-shaping filter when used in a π/4 QPSK modulation scheme.

Figure 1:
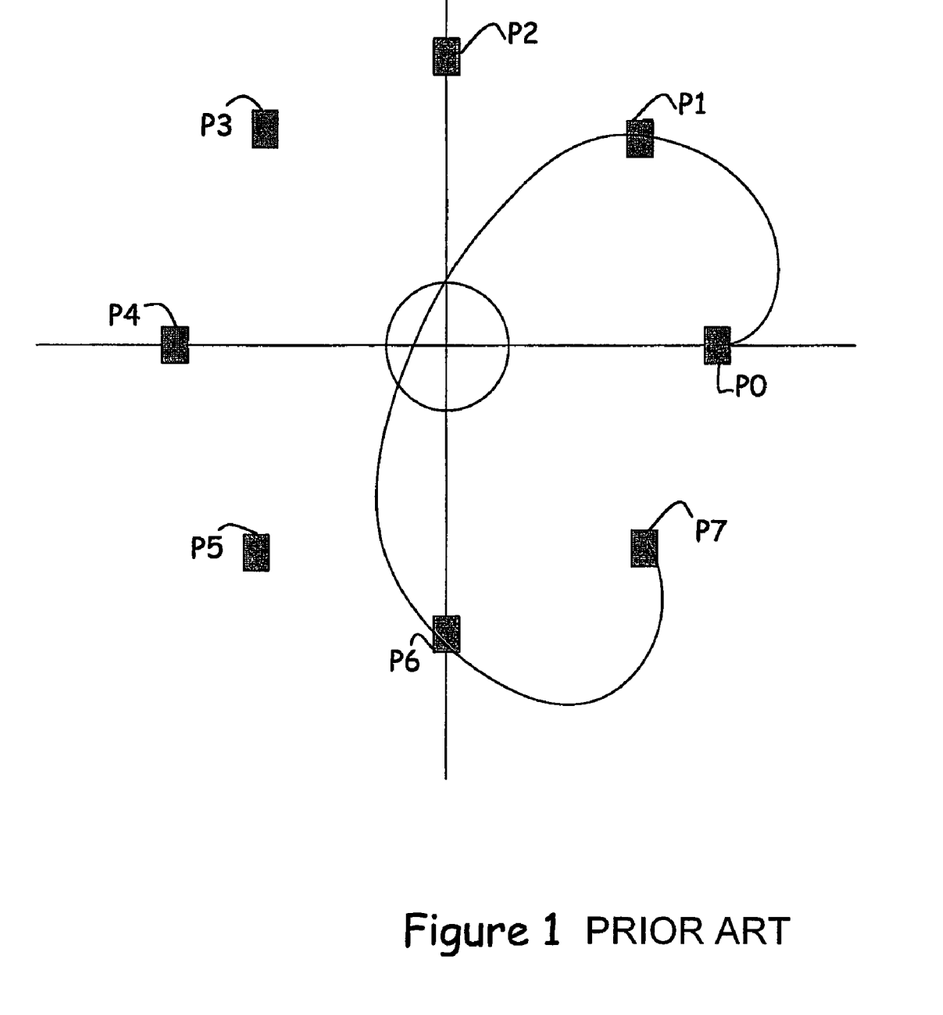
FIG. 1 is a representation of a channel symbol sequence having values {P0, P1, P6, P7} generated by a channel symbol mapper to represent a sample digital information stream.

FIG. 1 is a constellation diagram of such a system depicting the transition path between the constellation points. In this case, the modulation scheme is a π/4 QPSK modulation. One should note that many possible modulation schemes exist for digital communications, and that depicted in FIG. 1 is exemplary. This disclosure is not limited to the modulation scheme depicted, but should be read as covering all digital communications using constellations.

FIG. 1 is a representation of a channel symbol sequence having values {P0, P1, P6, P7} generated by a channel symbol mapper to represent a sample digital information stream. Note that in this path, the transition moves very close to the origin. Accordingly, the change in the angle between successive points near this minima is rapid. In terms of a broadcast signal, this angle measurement may be used to convey information (i.e. in a frequency modulated (FM) signal, or in other phase modulated systems.)

In the path depicted in FIG. 1, there may be intermediate samples associated with the path. Accordingly, the path as depicted may be made up of various pieces of information. Thus, for any sample in the path depicted in FIG. 1, the sample can be depicted in a form of an ordered pair of amplitude and angle. For low magnitude events, these are almost always characterized by a rapidly changing angle. If the path misses the origin by only a small amount, the change in angle will be greater in amount over a shorter time than for a larger amount. The closer to the origin that the path moves, the rate of change in the angle increases dramatically per unit of time or per sample interval. If the path goes through the origin, the rate of change transitions to an extreme event—an impulse phase shift in the angle (i.e. a discontinuous phase shift in zero time.)

In terms of implementation, the ability of these conventional systems to cope with such rapid changes in this angle measurement may lead to problems within the system. In these cases, many conventional communications systems encounter problems when dealing with the rapidly changing angle, since the components cannot necessarily easily deal with the rapidly changing phase information. Of course, the angle may refer to frequency or phase, depending upon the particular modulation. In the course of this description, the emphasis is on describing the application in terms of phase angle and changes in phase angle. One should note that the values could just as easily describe frequency and changes in frequency, and this description should be read as considering those values as well.

In some conventional solutions, conditioning a low magnitude event requires the definition of a local minima, from which corrections could be made if the signal entered or came close to. However, the associated noise with such solutions varies as the outer border of the defined minima varies. Accordingly, for these conventional solutions the associated noise is dependent upon the defined minima.

Additionally, such conventional solutions typically require corrections in two domains. For example, in some cases an input pulse is added to the entire path when the path encroached on a defined minima. In this case, the correction must be applied to both the coordinate and the ordinate of the path points or samples, as necessary. Further, when adding a pulse in this domain, the typical pulse impacted many points, since by definition the correction is a pulse that is applied to the whole path. Accordingly, these conventional solutions can affect the path or trajectory well outside the range of where they need be.

In yet other conventional solutions, entirely new samples are introduced. This affects the timing characteristics of the particular system. Again, like mentioned above, this may also introduce path effects to large portions of the trajectory.

BRIEF DESCRIPTION

A device for transmitting information in a communications signal is envisioned. The information is modulated, at least in part, with a first angle-related characteristic. The device has a digital conversion circuit operable to convert information to be broadcast into a digital form. A constellation mapper is coupled to the digital conversion circuit, and is operable to convert the digital information into information associated with a constellation. A trajectory generation circuit generates samples denoting a trajectory within the constellation for the information. A transition analysis circuit determines a change in value of an angle-related characteristic in a transition between two samples, and a threshold detection circuit detects whether the change in value fails to meet a particular threshold. An angle-related characteristic distribution circuit can then distribute a portion of the change in value associated with the transition to at least one other transition.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

DETAILED DESCRIPTION

Embodiments of the present invention are described herein in the context of an apparatus and method for conditioning a modulated signal in a communications device. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of digital systems, including hardware, software, or any combination thereof. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

Figure 2:
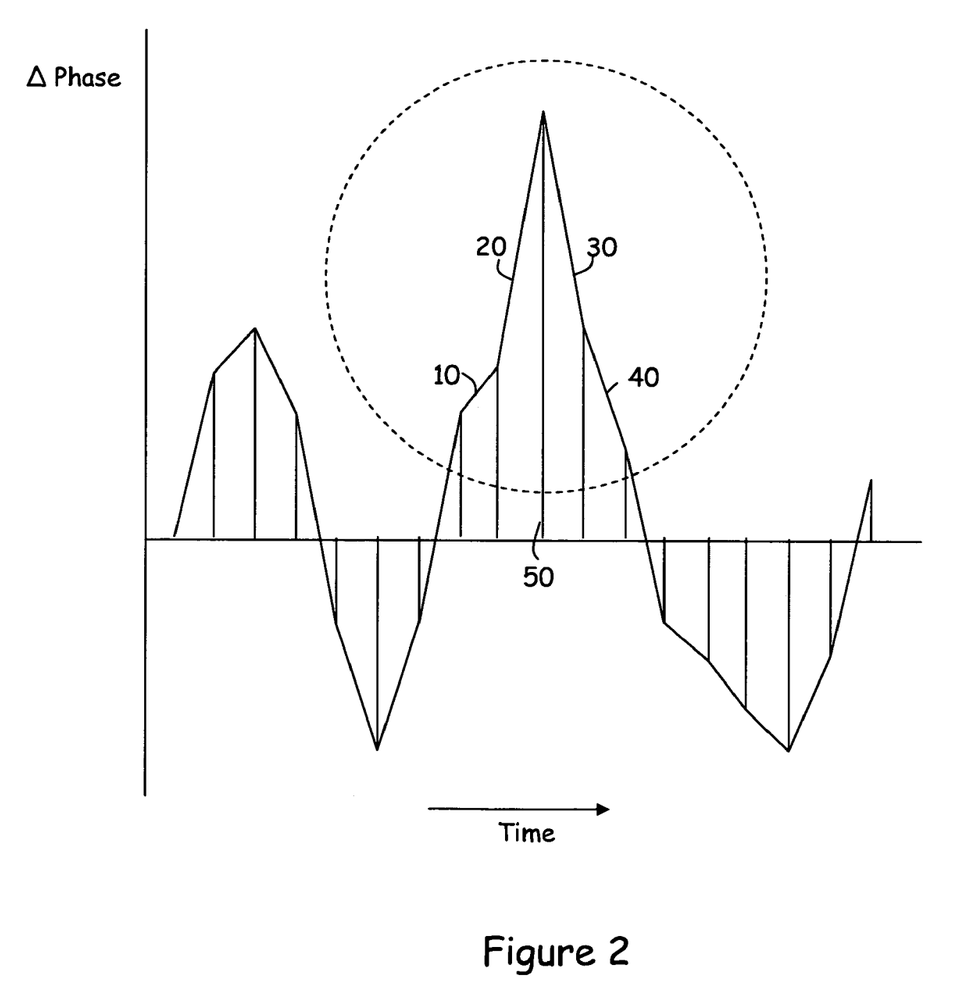
FIG. 2 is a time diagram denoting a digital representation of a phase signal in a communications constellation.

FIG. 2 is a time diagram denoting a digital representation of a phase signal in a communications constellation. The graph depicts a delta phase (the change in phase, or Δ phase) versus time. As the system moves from point to point in the constellation, a mapper circuit can produce various amplitudes and values of Δ phase to indicate the sample point on the path of FIG. 1. In this case, the summation of the Δ phase components always leads to a final phase component. Thus, in the graph of FIG. 2, the legs 10, 20, 30, and 40 respectively indicate a portion of the graph associated with low magnitude events. Especially in legs 20 and 30, a rapid change in phase occurs, due to the presence of a large Δ phase, as indicated by sample 50. In these instances, many conventional communications devices can be hard pressed to produce the signal required by this event.

Figure 3:
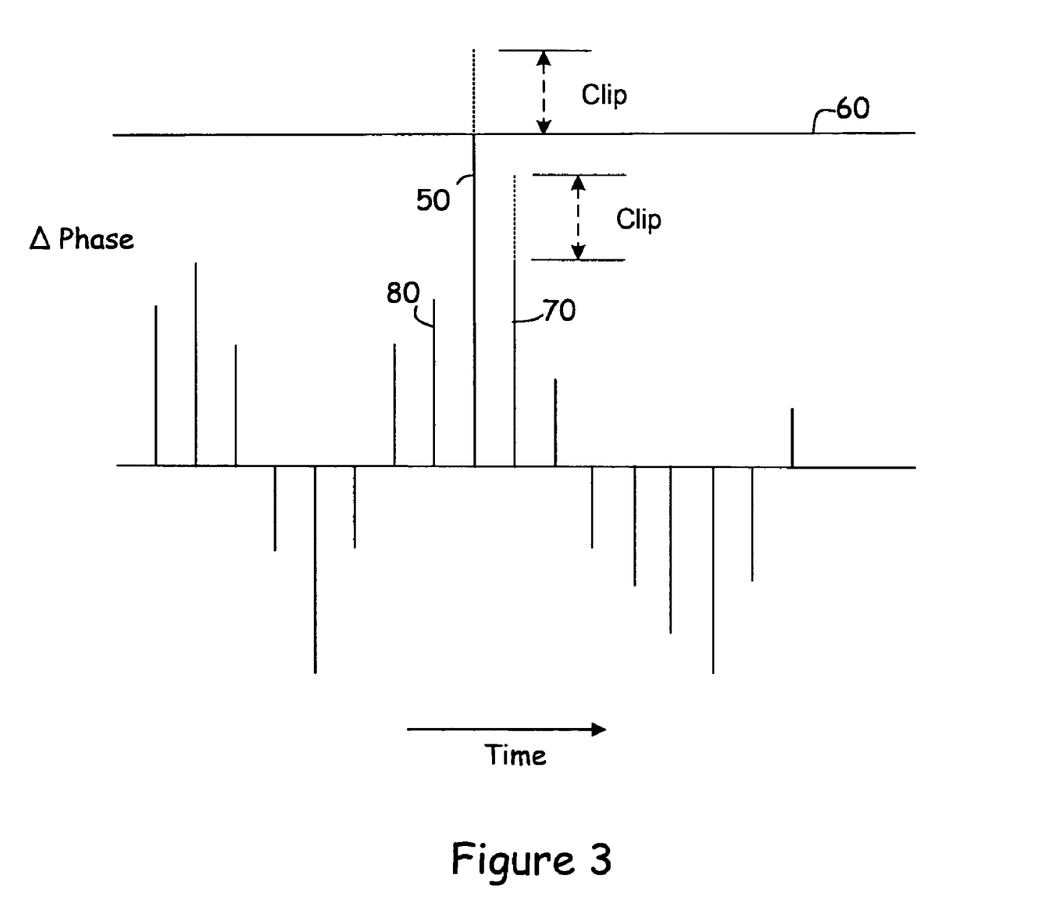
FIG. 3 is a diagram of a conditioning method or results of a conditioning circuit that conditions low magnitude events.

FIG. 3 is a diagram of a conditioning method or results of a conditioning circuit that conditions low magnitude events. In this case, a clip threshold 60 for the Δ phase is defined (i.e. a roof or maximal positive sample value). If a sample has a Δ phase above that level, this Δ phase is clipped from the sample and stored. In this case, the sample 50 exceeds this clip threshold and it is reduced to the clip threshold. That same clip amount is added to another sample 70. In this manner, the phase information for the entire transit is preserved in toto.

Of course, in this example the clip amount is added to a succeeding sample. It should be noted that the clip amount could be added just as easily to the preceding sample 80. Further, in the example denoted in FIG. 2, the sample 50 that is clipped has a positive sign and the difference between the clip threshold and the maximum clip is added to another sample. One can deal with a negative sign sample in a similar manner. In the case of a negative sample, the sample is compared to a clip threshold having a negative sign (i.e. a floor or minimal negative sample value). The difference between the floor and the sample is determined, and the magnitude of the difference is added to the sample, thus raising it to the minimal value. The magnitude of this difference is then added to the succeeding or preceding sample.

Of course, all this can be understood with magnitudes as well. If the magnitude of the sample is beyond a clip threshold, the difference between the magnitude of the sample and that clip threshold is determined. That magnitude is subtracted from a preceding or succeeding sample if the clipped sample was positive. If the clipped sample was negative, the difference is added to the preceding or succeeding level.

In short, a certain amount of a particular Δ phase sample is distributed to another Δ phase sample around the clipped sample. Stated in mathematical and logical terms, the action can be denoted as:

$$\text{if } |\Delta P_n - y| > x, \text{ then } \left\{ \begin{array}{l} \Delta P_n = \Delta P_n - z \\ \Delta P_{oi} = \Delta P_{oi} + z_i \end{array} \right\} \text{ and } \sum z_i = z,$$

where ΔP is a change in phase for a particular sample, n denotes which sample, y is threshold value, z is the amount to be redistributed, oi denotes the particular surrounding samples to which portions are distributed, and z.sub.i is the portion of z that is distributed to the particular sample.

In another example, the clip threshold and the amount distributed need not be the same. In this case, the amount that is distributed need not match the clip amount. However, due to the additive nature of the Δ phase sample, the amount taken from one sample should match the amounts distributed to another.

Figure 4:
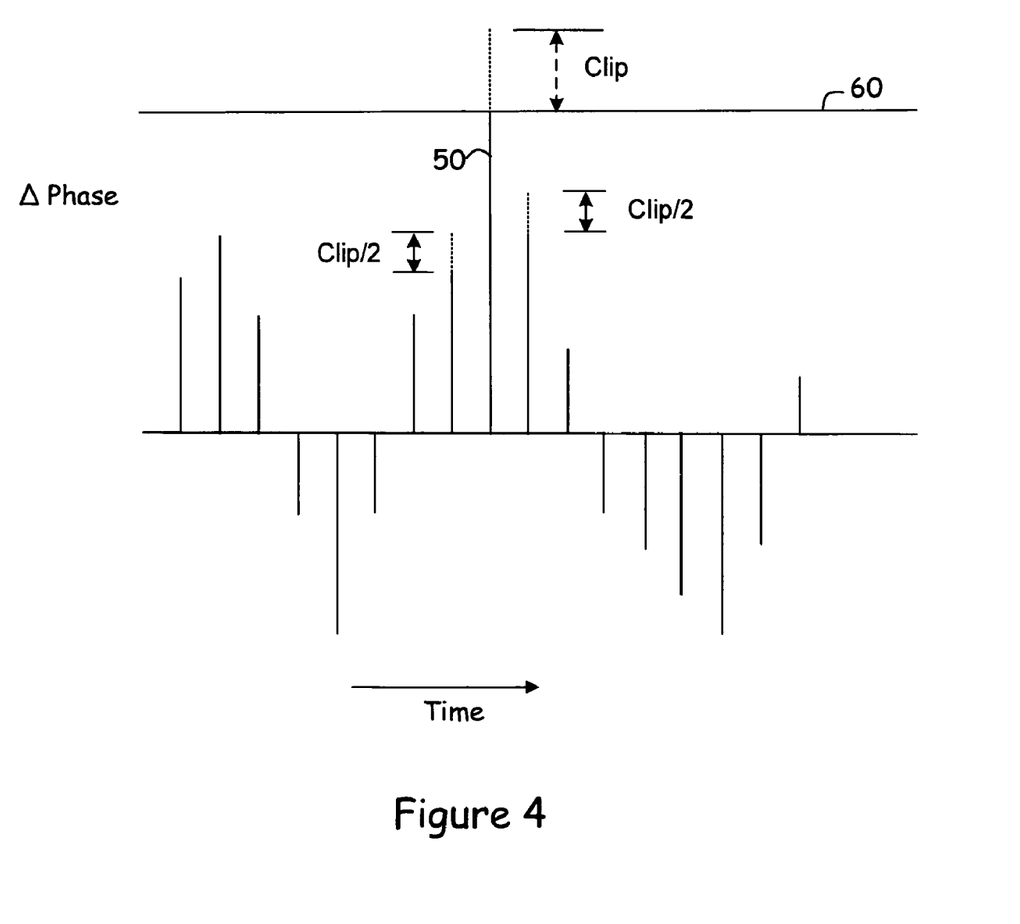
FIG. 4 is a diagram of another conditioning method or results of a conditioning circuit that conditions low magnitude events.

FIG. 4 is a diagram of another conditioning method or results of a conditioning circuit that conditions low magnitude events. In this case, the sample 50 again exceeds a clip threshold 60. However, in this case the resulting difference between the clip level and the amount that the sample exceeded the clip threshold by is distributed to two or more samples. In the case depicted, half the amount is distributed to the preceding sample and half the amount is distributed to the succeeding sample. Of course, various weights are possible in distributing the amount to more than one sample, and the samples can all be succeeding samples, all be preceding samples, or be a mixture of both succeeding and preceding samples. Again, the amount distributed need not be that amount by which the sample exceeds the clip threshold, but can be another amount.

Additionally, one should note that the transfer of values from discrete pulses accomplishes the function of removing area from underneath a point wise-discontinuous wave form centered on the pulse that clips and adding the same area to the wave form by increasing the area underneath the pulses that the amount is distributed to. A simple calculation of the triangles defined in the sample train lead to this conclusion. This makes sense, since if the samples represent Δ phase, then the integral of Δ phase is by definition phase. Thus, the area underneath the function is the total phase, i.e. the addition of all the Δ phase components to that point.

Figure 5:
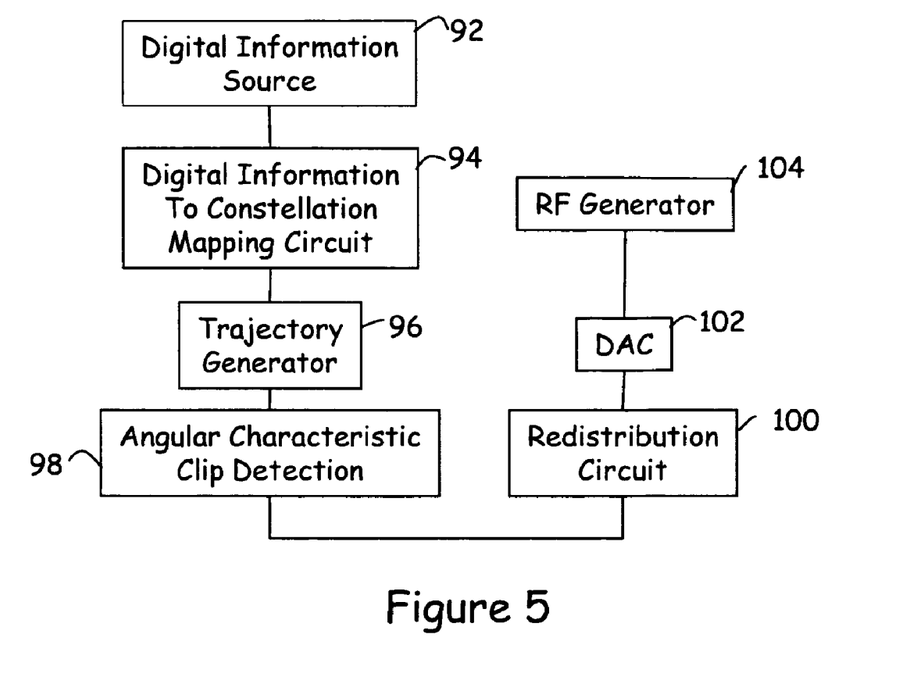
FIGS. 5, 6, and 7 are schematic block diagrams of communications devices that can perform the conditioning of FIGS. 3 and 4.
Figure 6:
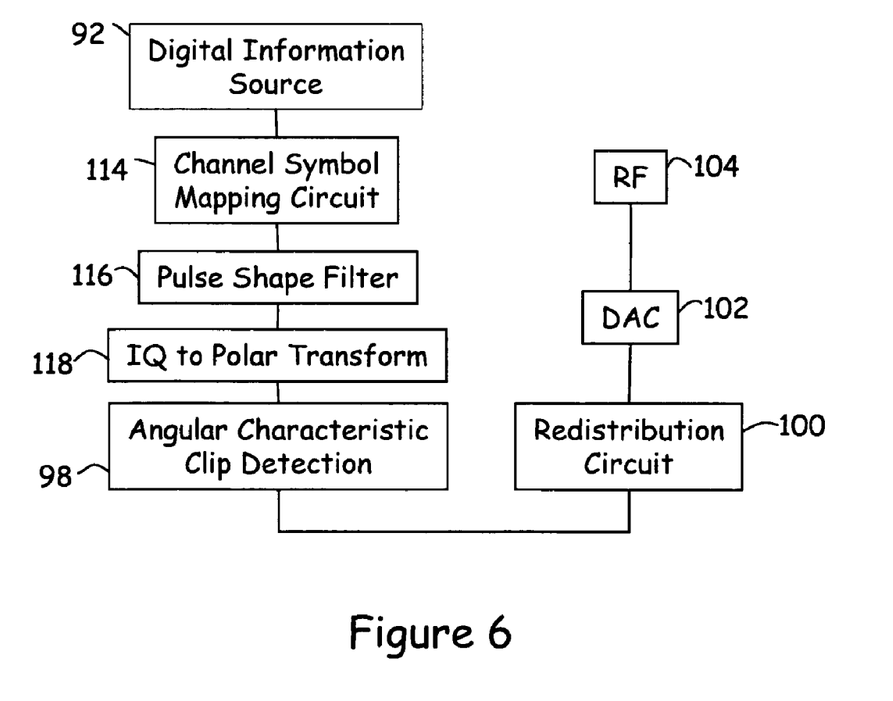
Figure 7:
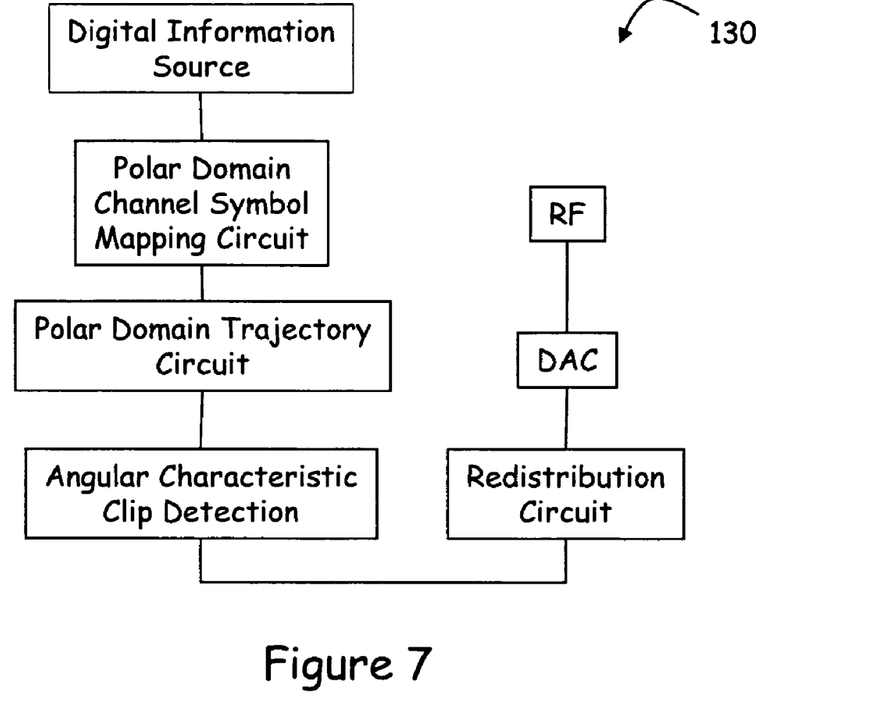

FIGS. 5, 6, and 7 are schematic block diagrams of communications devices that perform the conditioning of FIGS. 3 and 4. These are structures are possible embodiments to perform the conditioning on various constellations.

In FIG. 5, a communications device 90 is depicted. It has a digital information source 92 and a constellation mapping circuit 94. The constellation mapping circuit is operable to transform the digital information into constellation points or the various transitions within a constellation. A trajectory generator 96 receives the constellation information and provides a trajectory between the points in the specific constellation. The trajectory generator 96 can supply the various samples within the specific trajectory that will enable the communications device to supply the various transitions. A phase-characteristic clip determination circuit 98 monitors the output of the trajectory generator 96, and indicates the specific samples that should be clipped according to a criterion or set of criteria. A redistribution circuit 100 takes the clipped sample, and redistributes a portion of the clipped sample to other samples around the clipped sample. The samples are put into a digital to analog converter (DAC) 102 to obtain an analog signal, which is then relayed to a radio frequency (RF) generator 104.

In FIG. 6, a specific communications device 110 is depicted. The communications device 110 is adapted to process information in the IQ domain. It has the digital information source 92 and a channel symbol mapping circuit 114. The channel symbol mapping circuit is operable to transform the digital information into constellation points or the various transitions within a constellation, such as that depicted in FIG. 1. A pulse shape filter 116 receives the constellation information and provides a trajectory between the points in the specific constellation. The pulse shape filter 116 can supply the various samples within the specific trajectory that will enable the communications device to supply the various transitions. An IQ to polar transformation circuit 118 transforms the in phase (I) and quadrature (Q) signals to a polar domain. The phase-characteristic clip determination circuit 98 monitors the output of the IQ to polar transformation circuit 118, and indicates the specific samples that should be clipped. The redistribution circuit 100 takes the clipped sample, and redistributes a portion of the clipped sample to other samples around the clipped sample. The samples are put into a digital to analog converter (DAC) 102 to obtain an analog signal, which is then relayed to a radio frequency (RF) generator 104.

In still another example, depicted in FIG. 7, a communications apparatus 130 is envisioned. The communications apparatus is operable to translate the digital information into the polar domain directly as opposed to the IQ domain.

Figure 8:
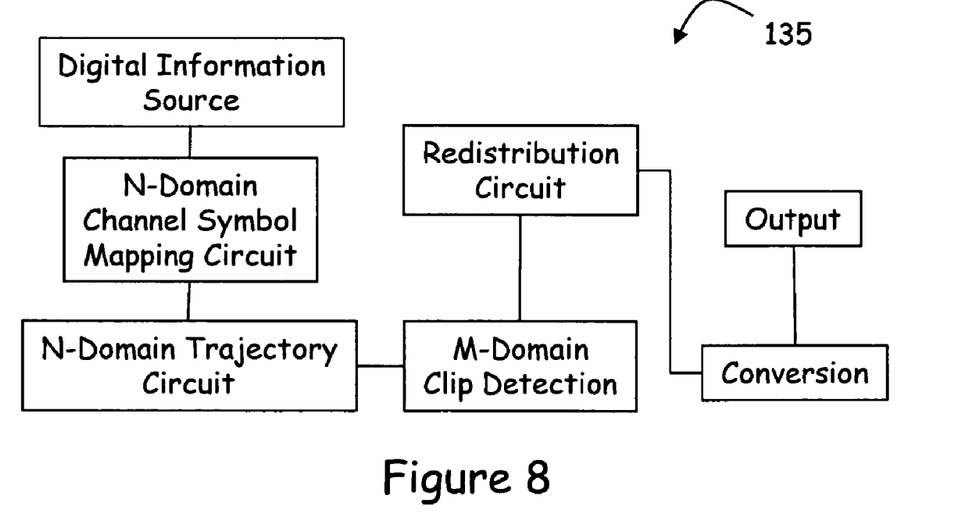
FIG. 8 is a schematic block diagram detailing an implementation in an arbitrary N-space and with other modulations.

FIG. 8 is a schematic block diagram detailing an implementation in an arbitrary N-space and with other modulations. As mentioned, the present description focuses on angular characteristics in the imaginary plane, where the angle of the sample is related to the angle-modulation method employed. In FIG. 8, a modulation scheme could be employed using more than the two dimensions envisioned in the imaginary plane. In this manner an apparatus 135 is envisioned that transforms the digital information into a state-space having an arbitrary number of domains. The trajectories are calculated in this N-Domain, and a clip detection can be employed on M domains, where the number M is smaller than the number N. A redistribution circuit distributes portions of the various M domains amongst other transitions, leaving one domain untouched.

Figure 9:
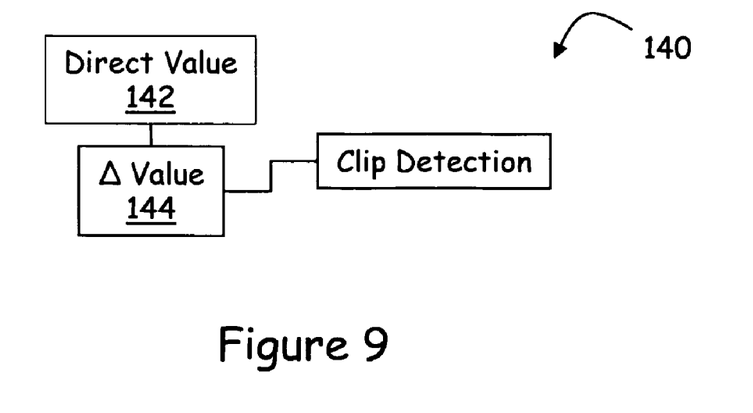
FIG. 9 is a schematic block diagram on a possible implementation of a portion of a communications circuit using the described methodology.

FIG. 9 is a schematic block diagram on a possible implementation of a portion of a communications circuit using the described methodology. A communications device 140 has a value determination circuit 142 that provides a direct value of a domain for a sample. This means that instead of directly providing the changes in the value to the system, direct values are generated. A change determination circuit 144 provides an appropriate delta or change in the direct value, based upon at least two direct values. In this manner, the direct value may be used to derive the delta values. Note that the direct value may be a frequency, phase, or other angle related measurement. In other words, the clip detection may be read to include frequency, phase, and other values related to the angular measurement of many modulated signals. Of course, other modulations in other state-spaces may be envisioned, and the clip detection and distribution may be employed in these other modulation schemes as well.

Figure 10:
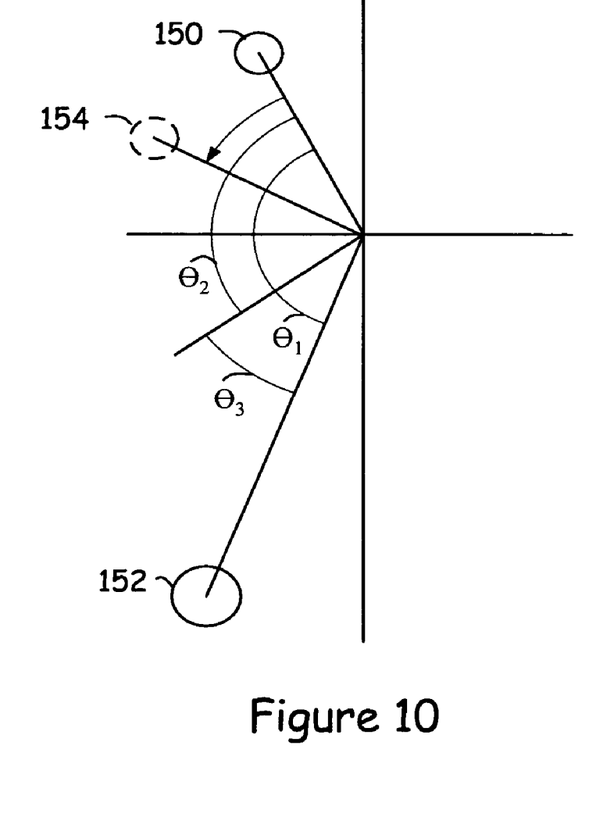
FIG. 10 is a diagram detailing the effects of the conditioning in the constellation path.

FIG. 10 is a diagram detailing the effects of the conditioning in the constellation path. A sample 150 is part of a path, and its succeeding sample is sample 152. From the origin, the change in angle between the two samples is denoted as $\theta_1$. An angle denoting the clip threshold is denoted as $\theta_2$. The angle denoted $\theta_3$ denotes the difference between the threshold and the angle actually traversed. This diagram highlights the case wherein the distributed portion and the amount clipped are the same, and the distributed amount is allocated to the previous sample. In this case, a new sample 154 denotes the altered sample 150 to which the angular difference between the clip threshold and the actual delta is allocated. Note that this allocation takes place in only one domain (the angle) without affecting the other domain (the radial distance.) In this manner, the large increase in one delta is reallocated to another, since by definition the delta between the new sample 154 and its preceding sample has been altered with respect to the delta between the original sample and the preceding sample.

Figures 11, 12:
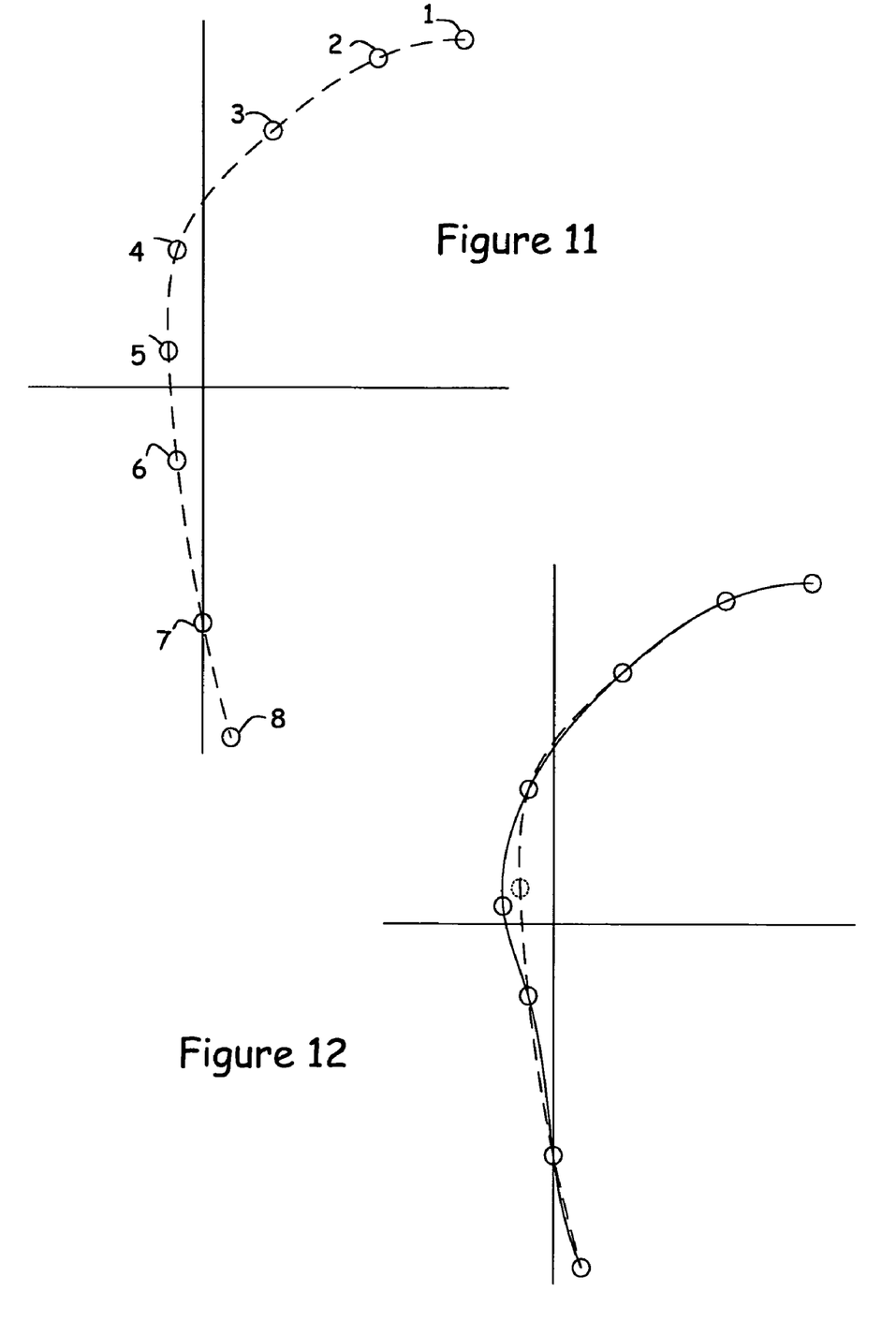
FIGS. 11-14 are graphs of constellations showing various embodiments in a generalized constellation space.
Figures 13, 14:
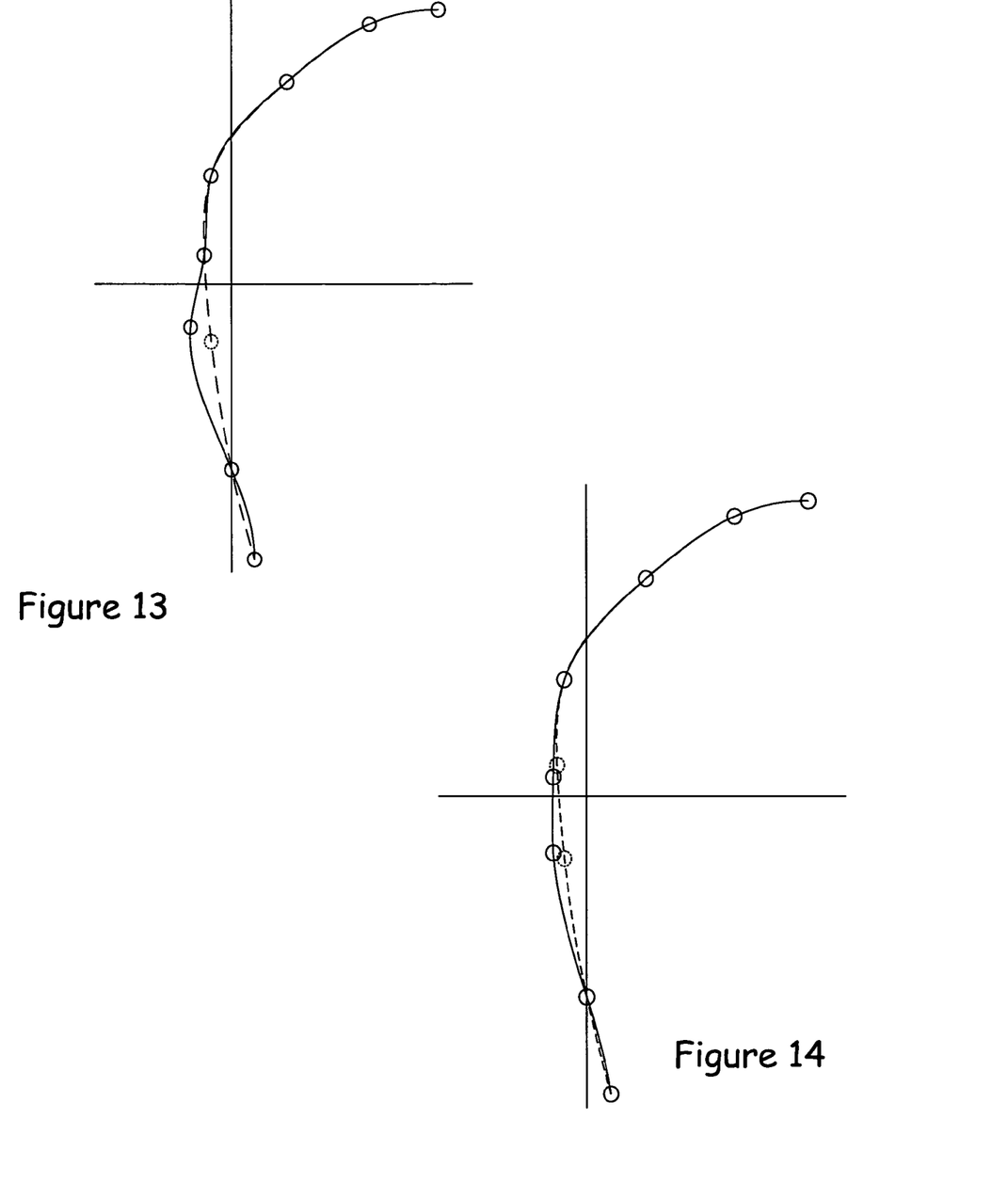

FIGS. 11-14 are graphs of constellations showing various embodiments in a generalized constellation space. FIG. 11 is a constellation graph showing an exemplary path between constellation points and having a low magnitude event. In this case, the contents of Table 1, infra, detail the germane aspects of this trajectory path with the 8 samples depicted in FIG. 11.

TABLE 1

| Sample | X | Y | R | Θ | Normalized Θ | Delta Θ |
|---|---|---|---|---|---|---|
| 1 | 1.875 | 2.375 | 3.02593 | 51.70984 | 51.70984 | |
| 2 | 1.25 | 2.25 | 2.573908 | 60.9454 | 60.9454 | 9.235559 |
| 3 | 0.5 | 1.75 | 1.820027 | 74.0546 | 74.0546 | 13.10921 |
| 4 | −0.187 | 0.938 | 0.956459 | 101.2747 | 101.2747 | 27.22008 |
| 5 | −0.25 | 0.25 | 0.353553 | 135 | 135 | 33.72531 |
| 6 | −0.187 | −0.5 | 0.533825 | −110.506 | 249.4942 | 114.4942 |
| 7 | 0 | −1.609 | 1.609 | −90 | 270 | 20.5058 |
| 8 | 0.203 | −2.391 | 2.399602 | −85.1471 | 274.8529 | 4.852872 |

Assume an embodiment where the clipping level is 90 and the distribution amount is to the preceding sample. In this case the results would be the same for all the samples, except for samples 5 and 6, as shown below in Table 2. FIG. 12 shows the new sample and path of the constellation path for this clip and redistribution.

TABLE 2

| Sample | Normalized Θ | Delta Θ | Clip | New Delta Θ | New Normalized Θ |
|---|---|---|---|---|---|
| 4 | 101.2747 | 27.22008 | | | |
| 5 | 135 | 33.72531 | | 58.21952 | 159.4942 |
| 6 | 249.4942 | 114.4942 | 24.4942 | 90.00 | 249.4942 |

In another example, assume the same clipping level but assume that the clipped amount is placed onto the succeeding sample. This would affect the clipped sample and the sample that the amount was distributed to, in this case samples 6 and 7. In this case, the results could be summarized in Table 3, below. This change is detailed in FIG. 13.

TABLE 3

| Sample | Normalized Θ | Delta Θ | Clip | New Delta Θ | New Normalized Θ |
|---|---|---|---|---|---|
| 6 | 249.4942 | 114.4942 | 24.4942 | 90.00 | 225 |
| 7 | 270 | 20.5058 | | 45 | 270 |
| 8 | 274.8529 | 4.852871 | | | |

In yet another example assume the same clipping level. However assume that the distributed amount is spread among the preceding and succeeding samples on an equal basis. The results are summarized in Table 4, below. This result is pictured in FIG. 14.

TABLE 4

| Sample | Normalized Θ | Delta Θ | Clip | New Delta Θ | New Normalized Θ |
|---|---|---|---|---|---|
| 4 | 101.2747 | 27.22008 | | | |
| 5 | 135 | 33.72531 | | 45.97241 | 147.2471 |
| 6 | 249.4942 | 114.4942 | 24.4942032 | 90 | 237.2471 |
| 7 | 270 | 20.5058 | | 32.7529 | 270 |
| 8 | 274.8529 | 4.852871 | | | |

Accordingly, this clip detect and redistribution allows for a conditioning of low magnitude events without extraneous overhead. This allows the low-magnitude events (distinguished by a high change in bandwidth in the phase or frequency component) to be dealt with on a sample point basis, or on a basis involving just a few sample points, as opposed to adding a pulse affecting the entire path. Further, the conditioning is performed in one domain, as opposed to multiple domains.

As noted previously, many conventional systems require a correction to be applied in more than one domain. In the previous versions known as "hole blowing", anytime the trajectory or sample came to or went below a predefined minima (typically defined as a value around the origin that was below some preset amount), the typical system would introduce a pulse or another sample to the system. In these solutions, this always impacts both the amplitude and the phase component of the existing samples or any new samples. Further, in these systems, the solution almost always typically involves altering more than one domain in question (i.e. adding a pulse always impacts adding to I and to Q in the I-Q domain.)

In the current description, for many of the embodiments, the clipping and redistribution can be performed solely in one sub-domain (i.e. in the specific case of FIG. 1, only the phase domain of the sample is impacted.) One will note that one could apply the clipping and redistribution to more than one domain, but the clipping and redistribution can be performed solely in one domain.

One other byproduct of the current description is that the effects of any conditioning can be limited to a single sample or to a specified narrow range of samples. In the other conventional systems, the addition of a pulse impacts not just the samples or area around the local minima, but has side effects extending to other samples or points in the constellation path. In the currently described system, a pulse is not added. Only specific discrete points are affected by the clipping and redistribution. There is no continuous pulse added anywhere in the system, therefore there is no impact on the path as a whole like in the other conventional solutions.

Thus, an apparatus and method for an apparatus and method for conditioning a modulated signal in a communications device is shown and described. Those skilled in the art will recognize that many modifications and variations of the present invention are possible without departing from the invention. Of course, the various features depicted in each of the Figures and the accompanying text may be combined together. Accordingly, it should be clearly understood that the present invention is not intended to be limited by the particular features specifically described and illustrated in the drawings, but the concept of the present invention is to be measured by the scope of the appended claims. It should be understood that various changes, substitutions, and alterations could be made hereto without departing from the spirit and scope of the invention as described by the appended claims that follow.

While embodiments and applications of this invention have been shown and described, it would be apparent to those Accordingly, we claim:

1. An apparatus for transmitting information in a communications signal, the information modulated, at least in part, with an angle-related characteristic, the apparatus comprising:
　　a digital conversion circuit for converting information to be broadcast into a digital form;
　　a constellation mapper, following the digital conversion circuit, for converting the digital information into information associated with a constellation;
　　a trajectory generation circuit, following the constellation mapper, for generating samples denoting a trajectory within the constellation;
　　a transition analysis circuit, following the trajectory generation circuit, for determining a change in value of the angle-related characteristic in a transition between two samples;
　　a threshold detection circuit, following the transition analysis circuit, for detecting whether the change in value of the angle-related characteristic fails to meet a particular clip threshold; and
　　an angle-related characteristic distribution circuit, following the threshold detection circuit, for determining a clip amount by which the change in value of the angle-related characteristic surpasses the clip threshold, and for distributing the clip amount to at least one other transition so that an amount of distribution matches the clip amount; and
　　a radio frequency generator following the angle-related characteristic distribution circuit, the radio frequency generator generating a radio frequency signal depending upon an output signal of the angle-related characteristic distribution circuit,
　　wherein the particular clip threshold is decided according to: the capability of the radio frequency generator to changing angle-related characteristic; and a spectral content of the angle-related characteristic.

2. The apparatus of claim 1 wherein the constellation has one domain associated with the angle-related characteristic.

3. The apparatus of claim 1 wherein the angle-related characteristic is frequency.

4. The apparatus of claim 1 wherein the angle-related characteristic is phase.

5. The apparatus of claim 1 wherein the communications signal is a time-varying amplitude signal.

6. The apparatus of claim 1 wherein the clip amount is distributed to a preceding transition and a succeeding transition.

7. The apparatus of claim 1 wherein the clip amount is distributed to at least one temporally preceding transition.

8. The apparatus of claim 1 wherein the clip amount is distributed to at least one temporally succeeding transition.

9. A method for transmitting information in a communications signal, the information modulated, at least in part, with an angle-related characteristic, the method comprising the steps of:
　　converting information to be broadcast into a digital form by using a digital conversion circuit;
　　converting the digital information into information associated with a constellation;
　　generating samples denoting a trajectory within the constellation by using a trajectory generation circuit;
　　determining a change in value of the angle-related characteristic in a transition between two samples;
　　detecting whether the change in value of the angle-related characteristic fails to meet a particular clip threshold;
　　determining a clip amount by which the change in value of the angle-related characteristic surpasses the clip threshold;
　　distributing the clip amount to at least one other transition by using a distribution circuit so that an amount of distribution matches the clip amount; and
　　generating a radio frequency signal depending upon values of the angle-related characteristic after the distribution by using a radio frequency generator,
　　wherein the particular clip threshold is decided according to: the capability of the radio frequency generator to changing angle-related characteristic; and a spectral content of the angle-related characteristic.

10. The method of claim 9 wherein the constellation has one domain associated with the angle-related characteristic.

11. The method of claim 9 wherein the angle-related characteristic is frequency.

12. The method of claim 9 wherein the angle-related characteristic is phase.

13. The method of claim 9 wherein the communications signal is a time-varying amplitude signal.

14. The method of claim 9 wherein the clip amount is distributed to a preceding transition and a succeeding transition.

15. The method of claim 9 wherein the clip amount is distributed to at least one temporally preceding transition.

16. The method of claim 9 wherein the clip amount is distributed to at least one temporally succeeding transition.

* * * * *